United States Patent
Lin (10) Patent No.: US 9,971,481 B2
(45) Date of Patent: May 15, 2018

(54) METHOD FOR DISPLAYING AN INTERACTION INTERFACE AND AN ELECTRONIC DEVICE FOR THE SAME

(71) Applicants: Beijing Lenovo Software Ltd., Beijing (CN); Lenovo (Beijing) Limited, Beijing (CN)

(72) Inventor: Yifu Lin, Beijing (CN)

(73) Assignees: Lenovo (Beijing) Limited, Beijing (CN); Beijing Lenovo Software Ltd., Beijing (CN)

( * ) Notice: Subject to any disclaimer, the term of this patent is extended or adjusted under 35 U.S.C. 154(b) by 387 days.

(21) Appl. No.: 13/938,815

(22) Filed: Jul. 10, 2013

(65) Prior Publication Data
US 2014/0019907 A1    Jan. 16, 2014

(30) Foreign Application Priority Data
Jul. 13, 2012   (CN) .......................... 2012 1 0245098

(51) Int. Cl.
*G06F 3/048*    (2013.01)
*G06F 3/0484*   (2013.01)
(Continued)

(52) U.S. Cl.
CPC .......... *G06F 3/0484* (2013.01); *G06F 3/0482* (2013.01); *G06F 3/04883* (2013.01); *G06F 2203/04804* (2013.01)

(58) Field of Classification Search
CPC .... G06F 3/0481; G06F 3/0482; G06F 3/0484; G06F 3/04883; G06F 2203/04804
See application file for complete search history.

(56) References Cited

U.S. PATENT DOCUMENTS 5,099,322 A * 3/1992 Gove ............... G08B 13/19602
                                                       348/700
5,577,187 A * 11/1996 Mariani ................ G06F 3/0481
                                                       715/792
(Continued)

FOREIGN PATENT DOCUMENTS

| CN | 1820224 A | 8/2006 |
| CN | 1992803 A | 7/2007 |
| CN | 201150089 Y | 11/2008 |

OTHER PUBLICATIONS

"Chinese Application No. 201210245098.8, Decision of Rejection dated Dec. 1, 2016", (dated Dec. 1, 2016), 8 pgs.

(Continued)

*Primary Examiner* — Kieu Vu
*Assistant Examiner* — Asteway T Gattew
(74) *Attorney, Agent, or Firm* — Schwegman Lundberg & Woessner, P.A.

(57) ABSTRACT

The present disclosure discloses an information processing method and an electronic device, and relates to the field of electronic device application. The disclosure is made to enable a user to perform image information processing while clearly viewing image information. The method comprises analyzing image information of a to-be-displayed image and/or a captured image; determining a display position of an interaction interface based on the result of analyzing; and displaying the interaction interface on a displaying unit based on the display position. The disclosure is mainly used in the process of taking phones by a mobile phone.

19 Claims, 7 Drawing Sheets

(51) Int. Cl.
*G06F 3/0482* (2013.01)
*G06F 3/0488* (2013.01)

(56) References Cited

U.S. PATENT DOCUMENTS

| | | | | |
|---|---|---|---|---|
| 6,915,490 B1* | 7/2005 | Ewing | ............... | G06F 3/0486 715/767 |
| 2004/0070675 A1 | 4/2004 | Fredlund et al. | | |
| 2007/0055986 A1* | 3/2007 | Gilley | ............... | G06Q 30/0241 725/34 |
| 2008/0204830 A1* | 8/2008 | Tanaka | ............... | H04N 1/00838 358/505 |
| 2008/0231751 A1* | 9/2008 | Zalewski | ............... | H04N 5/147 348/578 |
| 2008/0256466 A1* | 10/2008 | Salvador | ............... | G06T 19/00 715/762 |
| 2009/0252407 A1* | 10/2009 | Wang | ............... | H04N 7/0122 382/165 |
| 2010/0066863 A1* | 3/2010 | Misawa | ............... | G03B 17/02 348/231.99 |
| 2010/0070931 A1* | 3/2010 | Nichols | ............... | G06F 3/0488 715/863 |
| 2010/0156813 A1* | 6/2010 | Duarte | ............... | G06F 3/0488 345/173 |
| 2010/0229090 A1* | 9/2010 | Newton | ............... | G06F 3/0428 715/702 |
| 2013/0027318 A1* | 1/2013 | Lection | ............... | G06F 3/0486 345/173 |

OTHER PUBLICATIONS

"Chinese Application No. 201210245098.8, Office Action dated Aug. 17, 2016", w/ English Translation, (Aug. 17, 2016), 32 pgs.

"Chinese Application No. 201210245098.8, Office Action dated Dec. 16, 2015", w/ English Translation, (Dec. 16. 2015), 19 pgs.

\* cited by examiner

METHOD FOR DISPLAYING AN INTERACTION INTERFACE AND AN ELECTRONIC DEVICE FOR THE SAME

PRIORITY CLAIM AND RELATED APPLICATION

This application claims the benefit of priority under 35 U.S.C. Section 119 to Chinese Patent Application Serial No. 201210245098.8, filed Jul. 13, 2012, which application is incorporated herein by reference in its entirety.

TECHNICAL FIELD

The present disclosure relates to the field of electronic device application, and more particularly, to information processing methods and electronic devices.

BACKGROUND

Nowadays, an electronic device, for example, a mobile phone and a tablet, is usually equipped with a function of taking a photo/video. An electronic device normally operates in a full-screen pre-processing mode so as to obtain a maximum view. That is, the view of a view finder spreads throughout the display area on the screen. An operation menu of a view finder overlays the displayed content in the form of an On-Screen Display (OSD) menu, to facilitate a user to focus, select a photo taking mode, etc. Displaying of the OSD menu inevitably shades parts of the content of the view finder, and causes inconveniency to a user in viewing content of the view finder.

In general, the transparency of the OSD menu is enhanced to lower the affect of the OSD menu to the user in viewing content of the view finder. A user may visually see the content of the view finder overlaid by the OSD menu through the semi-transparent OSD menu. Alternatively, the OSD menu is set to hide automatically or by a user manually when the user is not performing a view-finding operation, and show when the user needs to perform a view-finding operation.

Such displaying of the OSD menu may address the problem that it is inconvenient for a user to view content of a view finder, but has disadvantages to some extents. In particular, the semi-transparent OSD menu is not completely transparent, and thus a user cannot clearly observe the content of the view finder overlaid by the OSD menu, disturbing fine view-finding operations of a user, such as local focusing or local over-exposure adjustment. The hidden OSD menu needs the user to perform frequently manual operations to hide/show the OSD menu, increasing the user's view-finding operations and the time for finding the view, and thus degrading the experience of the user. Meanwhile, such displaying of the OSD menu is not applicable to the case of taking a snapshot. Furthermore, applications such as a video/image viewer have the same disadvantage.

SUMMARY

Embodiments of the present disclosure provide an information processing method and an electronic device which are capable of displaying an OSD menu without disturbing a user in viewing content of a view finder, and facilitating a user in viewing the content of a view finder, thereby improving the experience of the user.

In an aspect, an information processing method is provided according to an embodiment of the present disclosure, comprising steps of
- analyzing image information of a to-be-displayed image and/or a captured image;
- determining a display position of an interaction interface based on the result of analyzing; and
- displaying the interaction interface on a displaying unit based on the display position.

In another aspect, an electronic device is provided according to an embodiment of the present disclosure, comprising:
- a processing unit configured to analyze image information of a to-be-displayed image and/or a captured image;
- a position determining unit configured to determine a display position of an interaction interface based on the result of the processing unit; and
- a displaying unit configured to display thereon the interaction interface at the display position determined by the position determining unit.

With the information processing method and electronic device according to embodiments of the present disclosure, it is possible to detect a position within image content where a user will not be disturbed in his/her viewing of important image information and display an interaction interface at the position. The information processing method and electronic device are capable of displaying an OSD menu without disturbing a user in viewing content of a view finder, and facilitating a user in viewing the content of a view finder, thereby improving the experience of the user.

BRIEF DESCRIPTION OF THE DRAWINGS

Hereunder drawings used in the embodiments of the present disclosure and prior art will be simply described to clearly explain the embodiments of the present disclosure or prior art. Obviously, the following drawings are only some embodiments of the present disclosure. For one skilled in the art, other drawing will be obtained according to these drawings without inventive effort.

DETAILED DESCRIPTION OF THE EMBODIMENTS

The solutions of embodiments of the present disclosure will be clearly and completely described from the following detailed description taken conjunction with the drawings. Obviously, the described embodiments are only a portion of embodiments of the present disclosure, rather than all embodiments. Based on embodiments in the present disclosure, every other embodiment obtained by one skilled in the art without inventive labors belongs to the protection scope of the present disclosure.

Figure 1:
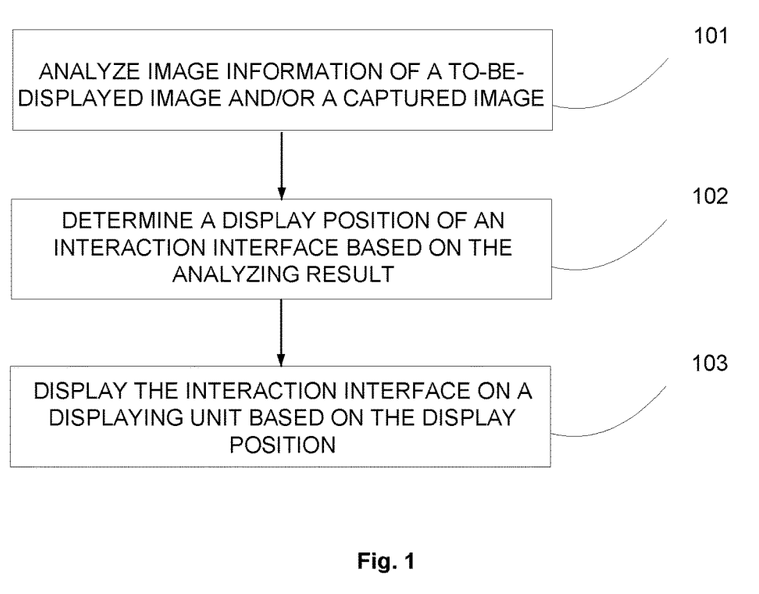
FIG. 1 is a flowchart of an information processing method according to an embodiment of the present disclosure.

There is provided an information processing method according to an embodiment of the present disclosure. As shown in FIG. 1, the method comprises the following steps.

At step 101, image information of a to-be-displayed image and/or a captured image is analyzed.

The to-be-displayed image may be an image file stored in memory space of an electronic device. The captured image may be an image captured by an image collecting unit of an electronic device. The image collecting unit includes but is not limited to a static image collecting unit and a dynamic image collecting unit.

The step of analyzing image information of a to-be-displayed image and/or a captured image includes analyzing important image information of the to-be-displayed image and/or captured image.

At step 102, a display position of an interaction interface is determined based on the result of analyzing.

A position where unimportant image information is located is determined to be a display position of the interaction interface according to the analyzing result of step 101. The unimportant image information is other image information than the important image information in the to-be-displayed image and/or captured image. The number of the position where unimportant image information is located may be, but do not limited to one in the to-be-displayed image and/or captured image.

At step 103, the interaction interface is displayed on a displaying unit based on the display position.

The interaction interface is displayed at the position where unimportant image information is located, so that a user will not be disturbed in viewing important image information, meanwhile an image processing operation interface (i.e., the interaction interface) is provided to the user. The interaction interface may include, but do not limited to an On-Screen Display (OSD) menu, which provides the user with various parameters for image processing by popping up a menu bar containing various options. The user is then provided with a way for processing image content, and can adjust the image content to the best.

Figure 2:
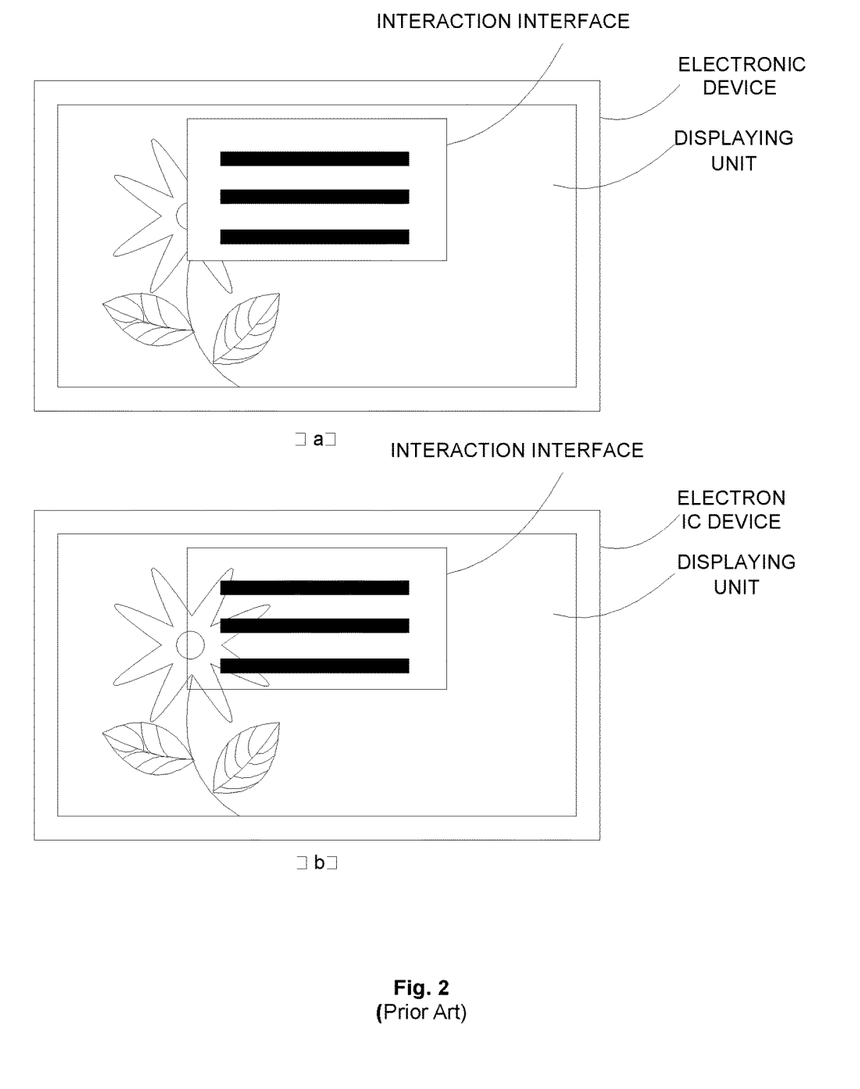
FIG. 2 is a diagram of an image display in the prior art.

In the prior art, the interaction interface is normally displayed on a preset position when it is used by a user to adjust image content. The display position of image information of image content is random, especially for dynamic image content. Accordingly, when the display position of important image information overlays the preset position of the interaction interface, the interaction interface shades the important image information, which disturbs the user in viewing the important image information. Generally, the object to be processed by the user with the interaction interface is important image information (or otherwise includes important image information). The shade on the important image information impacts user's determination on image display state, and thus disturbs adjustment of the image content by the user, as shown in FIG. 2(a).

In the prior art, the semi-transparent interaction interface enables the user to view image information shaded by the interaction interface. However, the image information overlays the interaction interface, in which case the user cannot clearly view both the image information and content of the interaction interface, as shown in FIG. 2(b). Inaccurate adjustment of the image content and mis-operation on the interaction interface may occur. The hidden interaction interface enables the user to view both the image information and content of the interaction interface clearly, whereas the frequent hiding/showing of the interaction interface degrades the experience of the user. With the information processing method according to the embodiment of the present disclosure, important image information in the to-be-displayed image and/or captured image is detected, and the interaction interface is displayed at a position where unimportant image information is located. The user can thus view both the image information and content of the interaction interface, and can correctly make determination and adjustment on the image display state because the important image information does not overlay the interaction interface.

The image content according to the embodiment of the present disclosure is the to-be-displayed image and/or captured image described above. The image information may be part or all of the image content in the to-be-displayed image and/or captured image. Such expression is applicable in the subsequent embodiments.

Figure 3:
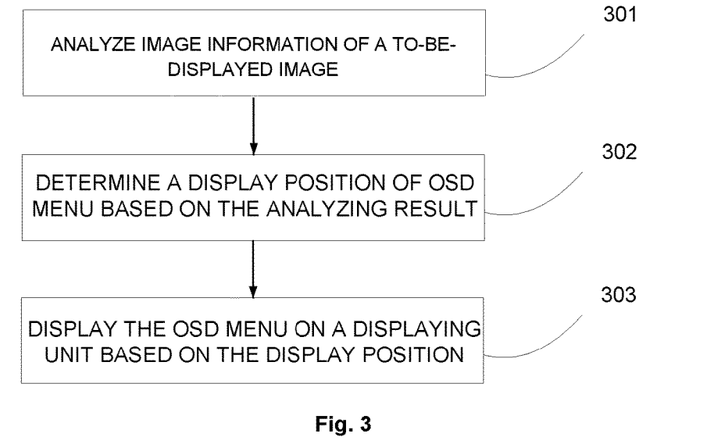
FIG. 3 is a flowchart of another information processing method according to an embodiment of the present disclosure.

As an extension and detailed description to the embodiment shown in FIG. 1, an embodiment of the present disclosure further provides an information processing method. In the information processing method according to the embodiment of the present disclosure, a to-be-displayed image stored in memory space of an electronic device is taken as an example. An OSD menu is taken as an example of an interaction interface. The embodiment of the present disclosure does not limit the processing object and processing method in a real application. As shown in FIG. 3, the method includes steps as follows.

At step 301, image information of a to-be-displayed image is analyzed.

In particular, there are two ways to analyze image information of a to-be-displayed image, including:

A) It is analyzed whether the to-be-displayed image includes human face information by a human face recognition technique.

If the to-be-displayed image includes human face information, the human face information is determined to be the important image information.

B) It is analyzed whether the to-be-displayed image includes blank image information.

If the to-be-displayed image includes blank image information, un-blank image information is determined to be the important image information. The un-blank image information is image information other than the blank image information in the to-be-displayed image.

Whether the to-be-displayed image includes blank image information may be analyzed by detecting a pixel gradation or color saturation, and determining that image information included by adjacent pixels in the image whose gradations (or color saturations) are the same or have a difference falling within a range is the blank image information.

When it is to detect the pixel gradation (or color saturation), a preset threshold for determining blank image information is set. The preset threshold may be, but do not limited to, one or a combination of number of pixels, shape and pixel gradation (or color saturation) of the blank image information. For example, the number of pixels of the blank image information may be set to be 1 million at the least, whereby the minimal size of the blank image information is defined. The shape of the blank image information may be set to be a rectangle or a square, so as to fit the size of the OSD menu. The pixel gradation (or the value of color saturation) of the blank image information may be set to 50% at the most, so as to prevent the blank image information from being too dark to clearly show the content of the OSD menu.

What shall be noted is that 1) the blank image information may be image information which includes adjacent pixels in the image whose gradations (or color saturations) are the same or have a difference falling within a range and meets a preset threshold condition; 2) the blank image information is image information which is monochromatic (or has a difference falling within a preset range), not only white image information; and 3) all the parameters mentioned in item B are given for illustration purpose, but not the real application is not limited thereto.

At step 302, a display position of the OSD menu is determined based on the result of analyzing.

The position where non-human-face image information is located is determined to be the display position of the OSD menu. The non-human-face image is image information other than human face image information in the to-be-displayed image. Alternatively, the position where the blank image information is located is determined to be the display position of the OSD menu.

Further, if there is determined more than one piece of non-human-face image information or blank image information, the position where a piece of non-human-face image information or blank image information among the pieces of non-human-face image information or blank image information that has a largest area and/or a shape best fits the OSD menu is located is determined to be the display position of the OSD menu. If each of the more than one piece of determined non-human-face image information or blank image information has an area not large enough to display the OSD menu, the position where a piece of non-human-face image information or blank image information having the least overlap area over a human face is located is determined to be the display position of the OSD menu.

Figure 4:
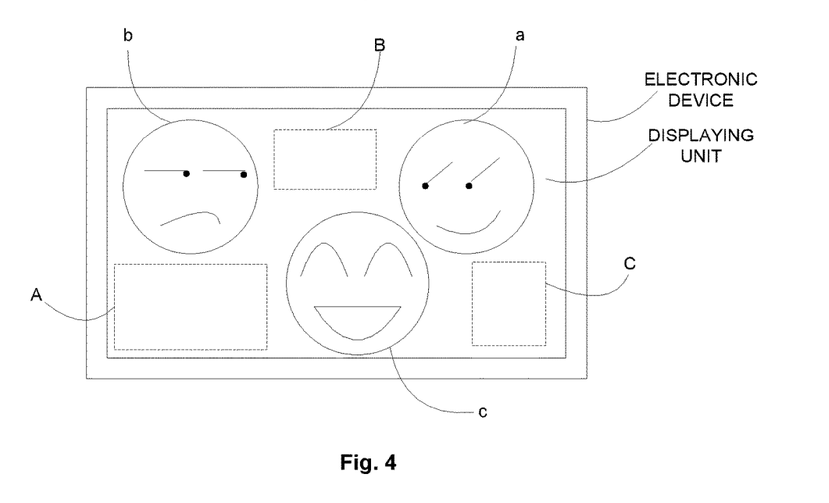
FIG. 4 is a diagram of an image display in an embodiment of the present disclosure.
Figure 5:
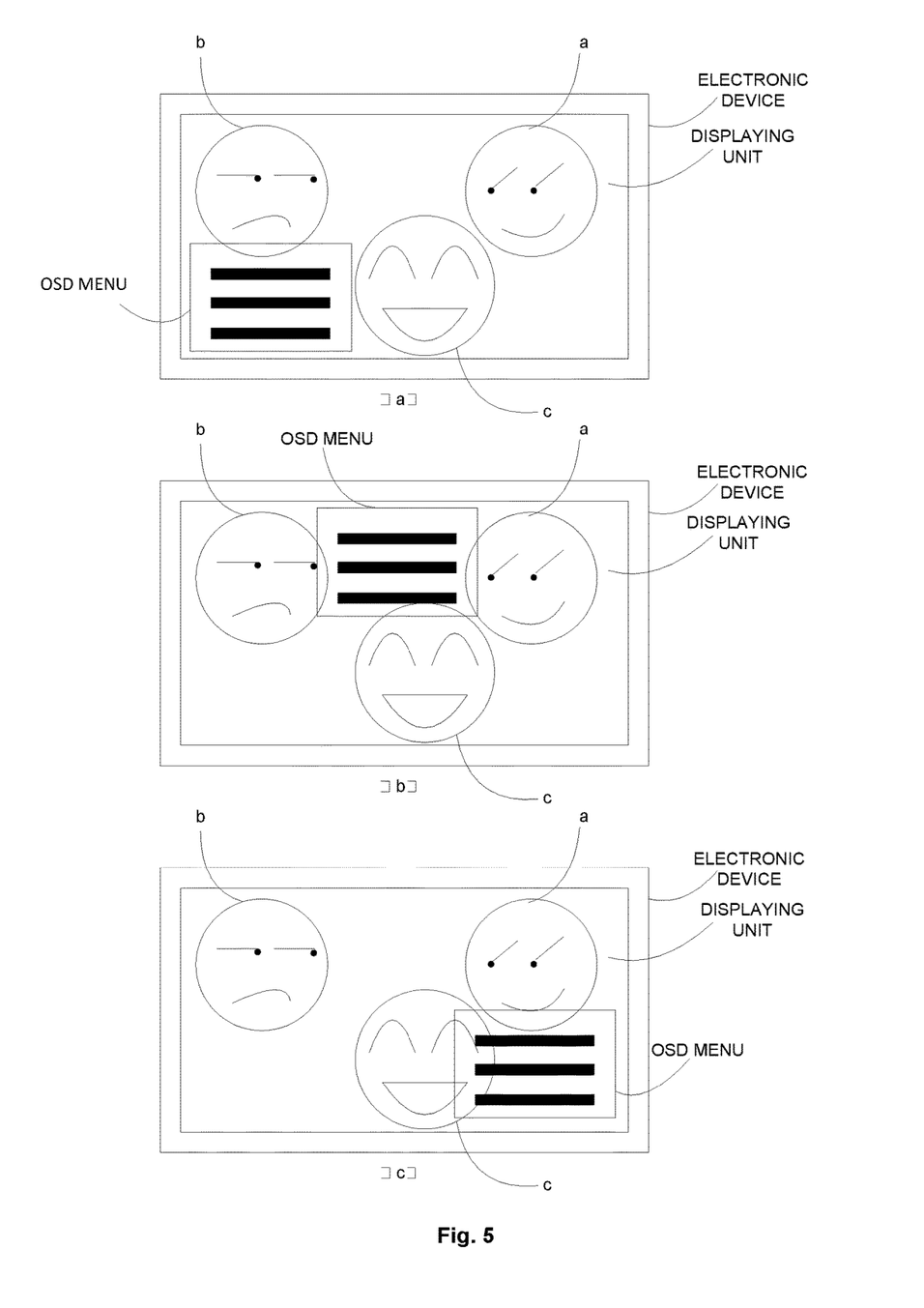
FIG. 5 is a diagram of another image display in an embodiment of the present disclosure.

Take human face information as an example. As shown in FIG. 4, there are three pieces of human face information a, b and c and three pieces of non-human-face image information A, B and C in the to-be-displayed image. The non-human-face image information A has a largest area and a most regular shape (with an area and size not less than those of the OSD menu), and thus the position where the non-human-face image information A is located is determined to be the display position of the OSD menu. As shown in FIG. 5(*a*), if each of the non-human-face image information A, B and C has an area and size that are not large enough to display the OSD menu, the position where the non-human-face image information A that has a largest area and a most regular shape is located is determined to be the display position of the OSD menu (that is, an area of a human face overlapped by the OSD menu arranged with non-human-face image information A is least). If the position where the non-human-face image information B or C is located is determined to be the display position of the OSD menu, the area of the human face overlapped by the OSD menu so arranged is larger than that of FIG. 5(*a*), as shown in FIGS. 5(*b*) and 5(*c*).

Alternatively, both the human face information and the blank image information in the to-be-displayed image may be detected at the same time, and a piece of image information among the detected at least one piece of non-human-face image information and at least one piece of blank image information that has a largest area and/or a shape best fits the OSD menu is determined to be the display position of the OSD menu.

At step 303, the OSD menu is displayed on a displaying unit based on the display position.

The OSD menu is displayed at the display position determined at step 302.

In the embodiment of the present disclosure, the human face image information and un-blank image information are important image information. The information processing method according to the embodiment of the disclosure displays the OSD menu at a position where non-human-face image information or blank image information is located, thereby providing a user with an image information processing interface without disturbing the user in viewing the important image information.

Furthermore, the information processing method according to the embodiment of the disclosure allows the user to adjust the display position and size of the OSD menu as required. That is, a change instruction for the OSD menu can be obtained by a preset interaction mechanism.

The preset interaction mechanism includes hard keys or a touch screen of an electronic device. The electronic device obtains the change instruction for the OSD menu sent by the user via the hard keys or touch screen, which change instruction indicates to adjust the position and/or size of the OSD menu.

Figure 6:
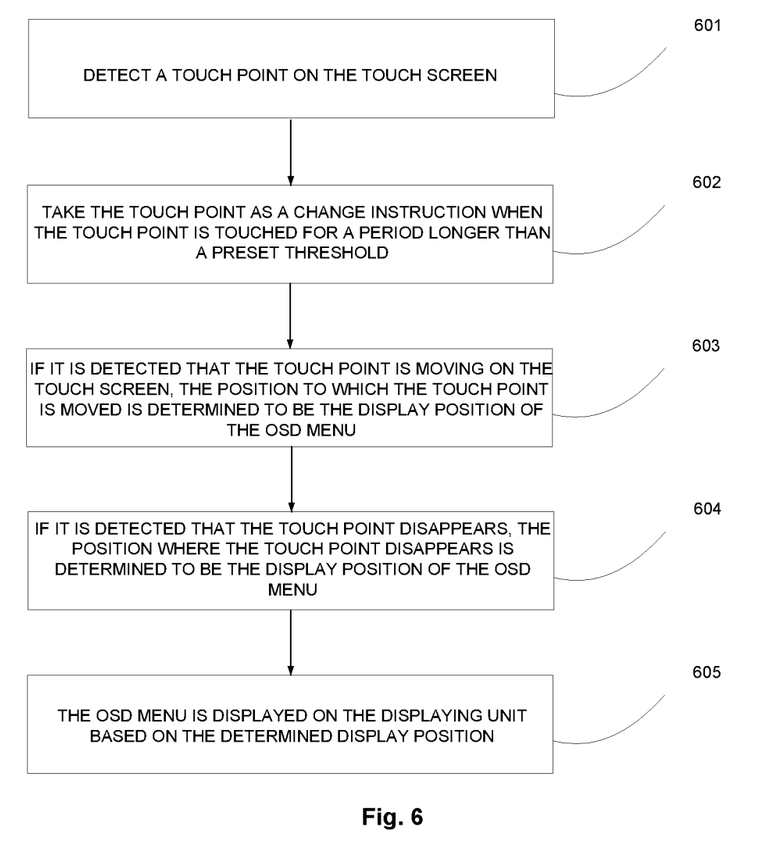
FIG. 6 is a flowchart of yet another information processing method according to an embodiment of the present disclosure.

Hereunder, the case where the position and/or size of the OSD menu is adjusted in response to a change instruction for the OSD menu is described in details by taking a touch sensitive electronic device as an example. As shown in FIG. 6, a method for adjusting the position of the OSD menu in response to a change instruction for the OSD menu includes the following steps.

At step 601, a touch point on the touch screen is detected.

At step 602, the touch point is taken as a change instruction when the touch point is touched for a period longer than a preset threshold.

The preset threshold may be 2 seconds. In such case, the electronic device identifies a touch point as a change instruction when the touch point is touched for more than 2 seconds. The OSD menu is activated to vibrate or twinkle to prompt the user that the OSD menu is movable.

At step 603, if it is detected that the touch point is moving on the touch screen, the position to which the touch point is moved is determined to be the display position of the OSD menu.

At step 604, if it is detected that the touch point disappears, the position where the touch point disappears is determined to be the display position of the OSD menu.

At step 605, the OSD menu is displayed on the displaying unit based on the determined display position.

At the same time, the OSD menu ceases vibrating or twinkling to prompt the user that the movement of the OSD menu is finished.

The touch screen in the embodiment of the present disclosure is the displaying unit.

In the implementation as shown in FIG. 6, the OSD menu may move from its initial display position to the determined display position after step 603 where the display position has been determined. Alternatively, the OSD menu may move continuously during the course where it is detected that the touch point moves continuously. Because the processing speed of a processor of an electronic device is far higher than the speed of human eyes identifying a change of an image, the embodiment shown in FIG. 6 provides the user with a feeling of continuous movement.

Figure 7:
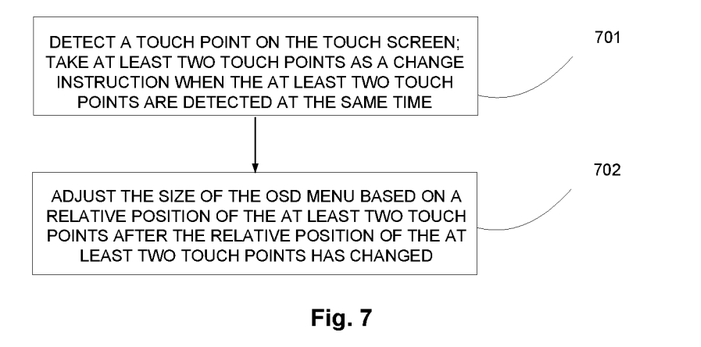
FIG. 7 is a flowchart of still another information processing method according to an embodiment of the present disclosure.

As shown in FIG. 7, a method for adjusting the size of the OSD menu in response to a change instruction for the OSD menu includes the following steps.

At step 701, a touch point on the touch screen is detected. When there are detected at least two touch points at the same time, the at least two touch points are taken as a change instruction.

The OSD menu is activated to vibrate or twinkle to prompt the user that the size of OSD menu is adjustable.

At step 702, the size of the OSD menu is adjusted based on a relative position of the at least two touch points after the relative position of the at least two touch points has changed.

The case where two touch points are detected is taken as an example. When two touch points are detected at the same time, the at least two touch points are identified as a change instruction. The condition for identifying a change instruction is that two touch points are detected at the same time, in which case the operation for determining whether the two touch points are touched for a period longer than a preset threshold does not happen. When the relative position of the two touch points becomes larger, the size of the OSD menu is enlarged according to a preset scale. When the relative position of the two touch points becomes smaller, the size of the OSD menu is shrunk according to a preset scale. When it is detected that the two touch points disappear, the OSD menu is displayed with a size that is determined when the two touch points disappear, and the OSD menu ceases vibrating or twinkling to prompt the user that the adjustment of size of the OSD menu is finished.

In the embodiment of the present disclosure, the adjustment methods of OSD menu shown in FIG. 6 and FIG. 7 may proceed independently or in combination. Putting another way, if two touch points move on the touch screen and the relative position of the two touch points changes as well, the electronic device moves the OSD menu while adjusting the size of the OSD menu.

In the embodiment of the present disclosure, the adjustment methods of OSD menu shown in FIG. 6 and FIG. 7 may follow the automatic adjustment of OSD menu shown in FIG. 3, or proceed independently when the electronic device displays the to-be-displayed image. The embodiment of the present disclosure is not limited thereto.

Moreover, the electronic device may store (display) position and/or size of the OSD menu after the adjustment of position and/or size of the OSD menu shown in FIG. 6 and/or FIG. 7, so that the OSD menu may be displayed on the touch screen based on the stored (display) position and/or size in a next information processing.

In the embodiment of the present disclosure, the electronic device may be mobile phone, television, computer or other device/display capable of display images. It is described by taking a touch screen as an example of the displaying unit. In a real application, the displaying unit is not limited to be a normal screen. It is described by taking an OSD menu as an example of the interaction interface. In a real application, the interaction interface is not limited to be an OSD menu. It is described by taking a to-be-displayed image as an example of the image content. In a real application, the image content may be an image captured by an image collecting unit of an electronic device. In the case that the image content is a static image captured by an image collecting unit, the image information processing method is the same as those shown in FIGS. 3, 6 and 7. In the case that the image content is a dynamic image captured by an image collecting unit, the dynamic image is initially divided into several static image frames, and then the static image frames are processed by means of the image information processing methods shown in FIGS. 3, 6 and 7. The detailed process is omitted herein.

In an instance of the embodiments of the present disclosure, the electronic device is a mobile phone and the processed image content is an image collected by a camera. When a user previews the image collected by the camera on the screen of the mobile phone, the OSD menu does not overlay important image information such as the human face. The user may operate on the OSD menu to focus, adjust sensitivity and others, and view processing result of the operations on the OSD menu to important image information at the same time.

The information processing method according to the embodiments of the present disclosure displays the OSD menu at a position where non-human-face image information or blank image information is located, or receives a change instruction sent by the user via a keyboard or a touch screen and adjusts the display position and/or size of the OSD menu according to the change instruction, thereby providing the user with an image information processing interface without disturbing the user in viewing important image information.

Figure 8:
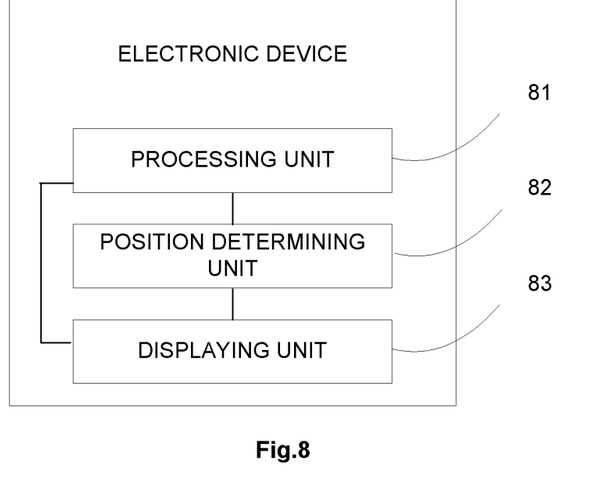
FIG. 8 is a schematic diagram showing a structure of an electronic apparatus according to an embodiment of the present disclosure.

Referring the above method embodiment, there is provided an electronic device according to an embodiment of the present disclosure to implement the method embodiment. The electronic device includes processing unit 81, position determining unit 82 and displaying unit 83, as shown in FIG. 8.

Processing unit 81 is configured to analyze image information of a to-be-displayed image and/or a captured image.

Position determining unit 82 is configured to determine a display position of an interaction interface based on the result of processing unit 81.

Displaying unit 83 is configured to display thereon the interaction interface at the display position determined by position determining unit 82.

Furthermore, displaying unit 83 may be a touch sensitive displaying unit.

Furthermore, the to-be-displayed image analyzed by processing unit 81 may be an image file stored in memory space of an electronic device. The captured image analyzed by processing unit 81 may be an image captured by an image collecting unit of an electronic device.

Figure 9:
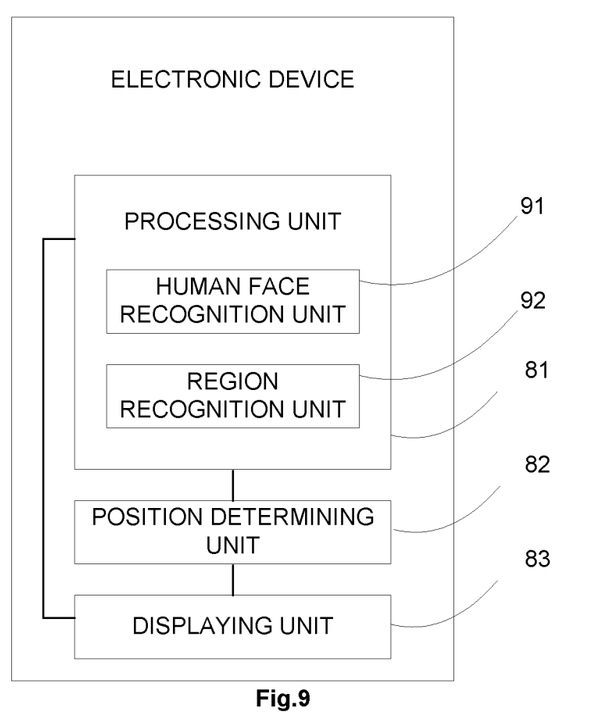
FIG. 9 is a schematic diagram showing a structure of another electronic apparatus according to an embodiment of the present disclosure.

Furthermore, as shown in FIG. 9, processing unit 81 includes human face recognition module 91 configured to analyze whether image information of the to-be-displayed image and/or captured image includes human face image information.

Furthermore, position determining unit 82 is configured to determine the position where non-human-face image information is located as the display position of the OSD menu if it is analyzed by human face recognition module 91 that the image information of the to-be-displayed image and/or captured image includes human face image information, the non-human-face image being image information other than human face image information in the to-be-displayed image and/or captured image.

Furthermore, processing unit 81 includes region recognition module 92 configured to analyze whether image information of the to-be-displayed image and/or captured image includes blank image information, the blank image information being image information whose gradation is not less than a preset threshold.

Furthermore, position determining unit 82 is configured to determine the position where blank image information is located as the display position of the OSD menu if it is analyzed by region recognition module 92 that image information of the to-be-displayed image and/or captured image includes blank image information.

Furthermore, position determining unit 82 is configured to determine a display position that has a largest area to be the display position of the OSD menu if there is determined more than one display position.

Furthermore, position determining unit 82 is configured to receive a change instruction for the OSD menu via an input device or displaying unit 83, which instruction indicates to more the interaction interface and/or adjust size of the OSD menu.

Furthermore, displaying unit 83 is configured to detect a touch point, and send the touch point as a change instruction to position determining unit 82 when the touch point is touched for a period longer than a preset threshold.

Position determining unit 82 is further configured to determine the position to which the touch point is moved as the display position of the OSD menu if it is detected by displaying unit 83 that the touch point is moving on the touch screen.

Displaying unit 83 is further configured to display the interaction interface based on the display position determined by position determining unit 82.

Furthermore, displaying unit 83 is configured to detect a touch point, and send at least two touch points as a change instruction to position determining unit 82 when the at least two touch points are detected at the same time.

When it is detected by displaying unit 83 that a relative position of the at least two touch points has changed, position determining unit 82 is configured to adjust size of the interaction interface based on the changed relative position of the at least two touch points.

Figure 10:
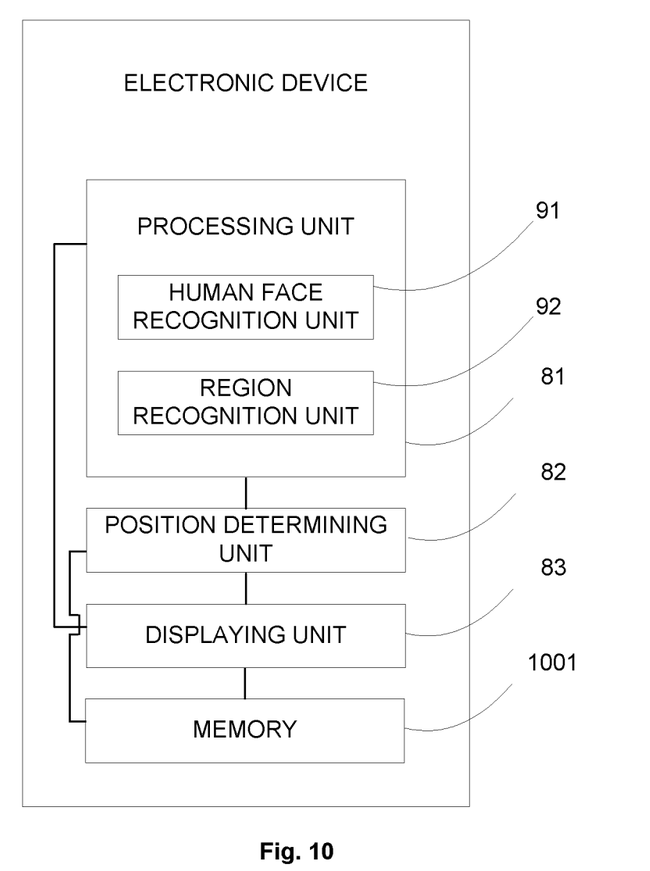
FIG. 10 is a schematic diagram showing a structure of yet another electronic apparatus according to an embodiment of the present disclosure.

Furthermore, as shown in FIG. 10, the electronic further includes:

Memory 1001 configured to store the display position and size of the interaction interface determined by position determining unit 82, so that displaying unit 83 displays the interaction interface based on the display position and size stored in memory 1001 in a next information processing.

In the embodiment of the present disclosure, the electronic device may be mobile phone, television, computer or other device/display capable of displaying images. It is described by taking a touch screen as an example of the displaying unit. In a real application, the displaying unit is not limited to be a normal screen. It is described by taking an OSD menu as an example of the interaction interface. In a real application, the interaction interface is not limited to be an OSD menu.

In an instance of the embodiments of the present disclosure, the electronic device is a mobile phone and the processed image content is an image collected by a camera. When a user previews the image collected by the camera on the screen of the mobile phone, the OSD menu does not overlay important image information such as the human face. The user may operate on the OSD menu to focus, adjust sensitivity and others, and view processing result of the operations on the OSD menu to important image information at the same time.

The electronic device according to the embodiment of the present disclosure displays the interaction interface at a position where non-human-face image information or blank image information is located, or receives a change instruction sent by the user via a keyboard or a touch screen and adjusts the display position and/or size of the interaction interface according to the change instruction, thereby providing the user with an image information processing interface without disturbing the user in viewing important image information.

It is apparent to those skilled in the art that the division of functional modules as above is illustrated for easy and simplicity of description. In a real application, the functions may be implemented by different functional modules as required, i.e., the apparatus may be differently divided into functional modules to implement all or part of the above functions. Such systems, apparatuses and units act as the processing of the preceding method embodiment. The detailed description is omitted herein.

It should be understood from the embodiments provided previously that the disclosed system, apparatuses and methods may be implemented in other ways. For example, the apparatus embodiment provided previously is provided for illustration. The division of the modules or units is logic division. Other divisions are applicable in real applications. For example, a plurality of units or components may be combined or integrated into another system, or some features may be omitted or do not occur. Furthermore, the coupling between units discussed or illustrated above or direct coupling or communication connection may have some interfaces. The indirect coupling or communication connection between means or units may be electronic, mechanical or other coupling.

Units that are illustrated as separate parts may be or may be not physically separate. Parts that are illustrated as units may be or may be not physical units. They may be located at one and the same position, or distributed among a plurality of network units. Some or all of the units may be selected to implement the embodiments of the present disclosure as needed.

Furthermore, various functional units of the embodiments of the present disclosure may be integrated into one processing unit. Alternatively, various units may be located independently. Two or more units may be combined into one unit. The integrated units may be implemented in hardware or software.

In case that the integrated units are implemented in software and sold or used as discrete products, they may be stored in a computer readable storage medium. It should be understood that the subject matters of the present disclosure that make contribution to the prior art may be in the form of software products which are stored on a storage medium and include instructions which may cause a computer device (may be personal computer, server or network device) or processor to implement part or all of the steps of the methods according to the various embodiments of the present disclosure. The storage medium includes USB disk, removable hard drive, Read-Only Memory (ROM), Random Access Memory (RAM), magnetic disk, optical disk or any medium that may store program codes.

The foregoing description is only directed to specific embodiments of the present disclosure. The scope of the present disclosure is not limited thereto. Any changes or replacements that are obvious to one of ordinary skill in the art in light of the present disclosure will fall within the scope thereof. The scope of the present disclosure is therefore defined by the attached claims.

What is claimed is:

1. An information processing method for use in an electronic device comprising at least a displaying unit, the method comprising:

analyzing image information of a to-be-displayed image and/or a captured image;

determining a display position of an interaction interface based on the result of analyzing; and displaying the interaction interface on a displaying unit based on the display position;

wherein said analyzing image information of a to-be-displayed image and/or a captured image further comprises:
analyzing whether image information of the to-be-displayed image and/or the captured image contains blank image information,
determining the position where blank image information is located as the display position of the interaction interface if image information of the to-be-displayed image and/or the captured image contains the blank image information, and
if there is determined more than one piece of blank image information and each of the more than one piece of blank image information has an area not large enough to display the interaction interface, calculating an overlap area of the interaction interface overlapping over a human face based on a location of the interaction interface, and determining a position where the interaction interface having the least overlap area over the human face is located to be the display position of the interaction interface.

2. The method according to claim 1, wherein the to-be-displayed image is an image file stored in memory space of the electronic device; and
wherein the captured image is an image captured by an image collecting unit of the electronic device.

3. The method according to claim 2, wherein analyzing image information of a to-be-displayed image and/or a captured image further comprises:
analyzing whether image information of the to-be-displayed image and/or the captured image contains human face image information.

4. The method according to claim 3, wherein determining a display position of an interaction interface based on the result of analyzing further comprises:
determining the position where non-human-face image information is located as the display position of the interaction interface if image information of the to-be-displayed image and/or the captured image contains human face image information, the non-human-face image being image information other than human face image information in the to-be-displayed image and/or the captured image.

5. The method according to claim 4, wherein determining a display position of an interaction interface based on the result of analyzing further comprises:
if there is determined more than one display position, determining the position that has a largest area as the display position of the interaction interface.

6. The method according to claim 2, wherein after displaying the interaction interface on a displaying unit based on the display position, the method further comprises:
receiving a change instruction for the interaction interface via a preset key on a keyboard; or receiving a change instruction for the interaction interface a touch screen in case that the displaying unit is the touch screen, the change instruction indicating that a size of the interaction interface of adjustable, comprising detecting a touch point on the touch screen, and taking the touch point is as a change instruction when the touch point is touched for a period longer than a preset threshold.

7. The method according to claim 6, wherein receiving a change instruction for the interaction interface via a touch screen further comprises:
if it is detected that the touch point is moving on the touch screen, determining the position to which the touch point is moved as the display position of the interaction interface; and
displaying the interaction interface on the displaying unit based on the display position.

8. The method according to claim 6, wherein receiving a change instruction for the interaction interface via a touch screen further comprises:
detecting a touch point on the touch screen, and taking at least two touch points as a change instruction when the at least two touch points are detected at the same time on the touch screen; and
adjusting size of the interaction interface based on a relative position of the at least two touch points after the relative position of the at least two touch points has changed.

9. The method according to claim 6, wherein after receiving a change instruction for the interaction interface, the method further comprises:
storing the display position and size of the interaction interface so that the interaction interface is displayed on the displaying unit based on the stored display position and size in a next information processing.

10. The method according to claim 1, wherein the interaction interface is an On-Screen Display (OSD) menu.

11. An electronic device comprising at least a displaying unit, the electronic device further comprising:
a processor comprising hardware being configured to
analyze image information of a to-be-displayed image and/or a captured image; and
determine a display position of an interaction interface based on the result analyzed;
wherein the displaying unit is configured to display thereon the interaction interface at the display position determined, and
wherein the hardware is further configured to analyze whether image information of the to-be-displayed image and/or the captured image contains blank image information, determine the position where blank image information is located as the display position of the interaction interface if it is determined that image information of the to-be-displayed image and/or the captured image contains the blank image information, and if there is determined more than one piece of blank image information and each of the more than one piece of blank image information has an area not large enough to display the interaction interface, calculate an overlap area of the interaction interface overlapping over a human face based on a location of the interaction interface, and determine a position where the interaction interface having the least overlap area over the human face is located to be the display position of the interaction interface.

12. The electronic device according to claim 11, wherein the to-be-displayed image is an image file stored in memory space of the electronic device.

13. The electronic device according to claim 12, wherein the hardware is further configured to determine whether image information of the to-be-displayed image and/or the captured image contains human face image information.

14. The electronic device according to claim 13, wherein the hardware is further configured to:
determine the position where non-human-face image information is located as the display position of the interaction interface if it is determined that image information of the to-be-displayed image and/or the captured image contains human face image information, the nonhuman-face image being image information other than human face image information in the to-be-displayed image and/or the captured image.

15. The electronic device according to claim 14, wherein the hardware is further configured to:
    if there is determined more than one display position, determine the position that has a largest area as the display position of the interaction interface.

16. The electronic device according to claim 12, wherein the hardware is further configured to receive a change instruction for the interaction interface via an input device or receive a change instruction for the interaction interface a touch screen in case that the displaying unit is the touch screen, the change instruction indicating that a size of the interaction interface of adjustable, comprising detecting a touch point on the touch screen, and taking the touch point is as a change instruction when the touch point is touched for a period longer than a preset threshold.

17. The electronic device according to claim 16, wherein the displaying unit is further configured to:
    determine the position to which the touch point is moved as the display position of the interaction interface if it is detected that the touch point is moving on the touch screen; and
    the displaying unit is further configured to display the interaction interface based on the display position determined.

18. The electronic device according to claim 16, wherein the hardware is further configured to:
    detect a touch point, and send at least two touch points as a change instruction to the processor when the at least two touch points are detected at the same time;
    wherein when it is detected that a relative position of the at least two touch points has changed, the hardware is configured to adjust size of the interaction interface based on the changed relative position of the at least two touch points.

19. The electronic device according to claim 16, further comprising:
    a memory configured to store the display position and size of the interaction interface determined, so that the displaying unit displays the interaction interface based on the display position and size stored in the memory in a next information processing.

* * * * *